Sept. 11, 1962     A. J. BACHELDER ET AL     3,053,160
PHOTOGRAPHIC FILM UNIT

Original Filed July 10, 1956     4 Sheets-Sheet 2

Albert J. Bachelder
Vaito K. Eloranta
INVENTORS

BY Brown and Mikulka
ATTORNEYS

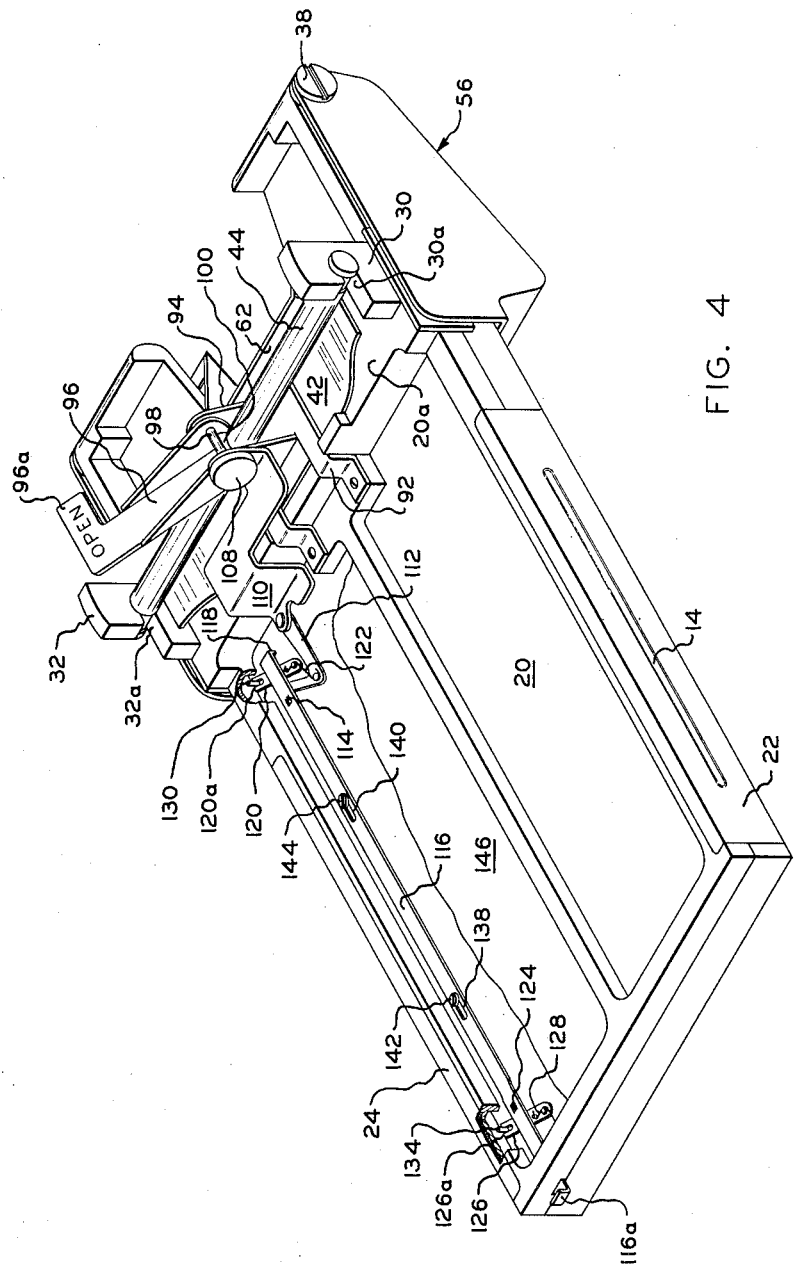

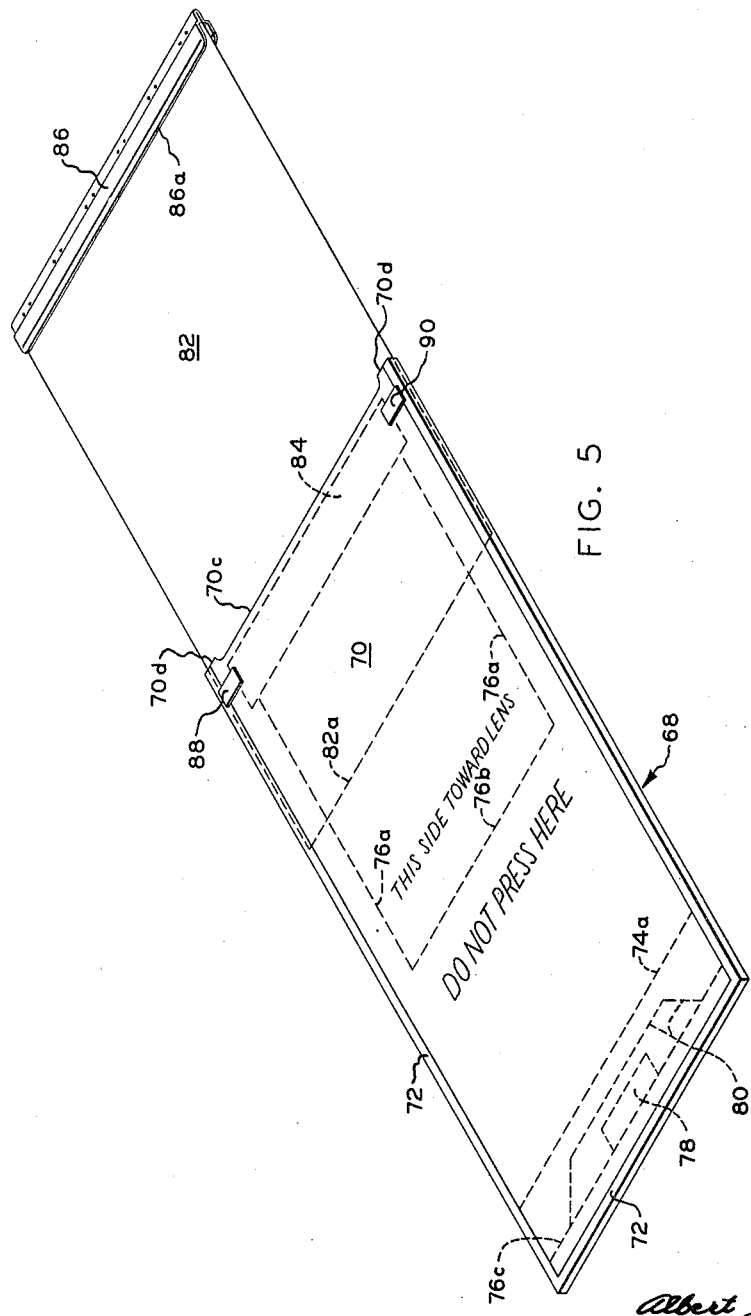

United States Patent Office 3,053,160
Patented Sept. 11, 1962

3,053,160
PHOTOGRAPHIC FILM UNIT
Albert J. Bachelder, Lexington, and Vaito K. Eloranta, Needham, Mass., assignors to Polaroid Corporation, Cambridge, Mass., a corporation of Delaware
Continuation of application Ser. No. 596,923, July 10, 1956. This application Aug. 8, 1960, Ser. No. 48,329
8 Claims. (Cl. 95—72)

The present invention relates to improvements in photographic film units.

This application is a continuation of our copending application Serial No. 596,923, filed July 10, 1956, now abandoned.

An object of the invention is to provide an improved as assembly of sheet and processing materials for use with photographic camera adapter apparatus which can be loaded in the adapter in daylight and which permits facility both in the photographic exposure of a photosensitive layer or surface of the assembly and in the processing of said layer and another layer of the assembly to provide a positive image of the subject of the exposure.

These and other objects of the invention will in part be obvious and will in part appear hereinafter.

The invention accordingly comprises a photographic film unit possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 4 is a perspective view, with parts broken away, of elements of the adapter shown from a side which is opposite to that of FIG. 1; and FIG. 5 is a perspective view of the assembly of FIG. 2 showing an enclosing envelope element of the structure withdrawn from the photosensitive surface, thus placing the latter in readiness for a photographic exposure.

The present invention relates to film units for use with adapter apparatus comprising a composite structure having fixed and movable sheet-like and enclosing parts and cooperating mechanism for performing or permitting various physical operations with respect to the film unit, said operations relating to photographic exposure of a photosensitive surface or layer to actinic radiation and to a subsequent photographic transfer process. The photographic transfer process involves the controlled progressive application of mechanical stress to the composite structure to effect the release and spreading of a liquid reagent between the photographically exposed photosensitive surface and a print-carrying surface, the surfaces being formed on sheet-like components of the unit and assembled in face-to-face relation. The transfer process may, in one form thereof, be said to be performed through permeation of the photographically exposed photosensitive surface and the development of a latent image formed in the emulsion thereof by a photographic developer and by a fixer for silver halide comprised by the liquid reagent; by removing undeveloped silver halide from the emulsion in the form of a soluble complex and by transporting it from the emulsion to the print-carrying layer so as to form a positive image in the latter. Examples of photographic materials suitable for use in a photographic process of a type contemplated herein or of related processes are set forth in detail in Patents Nos. 2,543,181, 2,559,643, 2,614,926, 2,647,049 and 2,647,056, all issued to Edwin H. Land.

More particularly, the invention is related to a novel film unit for use with apparatus for performing certain physical steps which make possible the accomplishment of the foregoing types of photographic transfer processes; such apparatus may be in a form which is suitable for attachment to or incorporation with a camera, such as a "press camera." This form of camera is exemplified by the "Speed Graphic" camera manufactured by the Graflex Company of Rochester, New York. A special type of mechanical assembly of sheet-like and processing components is required and it is with such an assembly of components that the present invention is primarily concerned.

Figure 1:
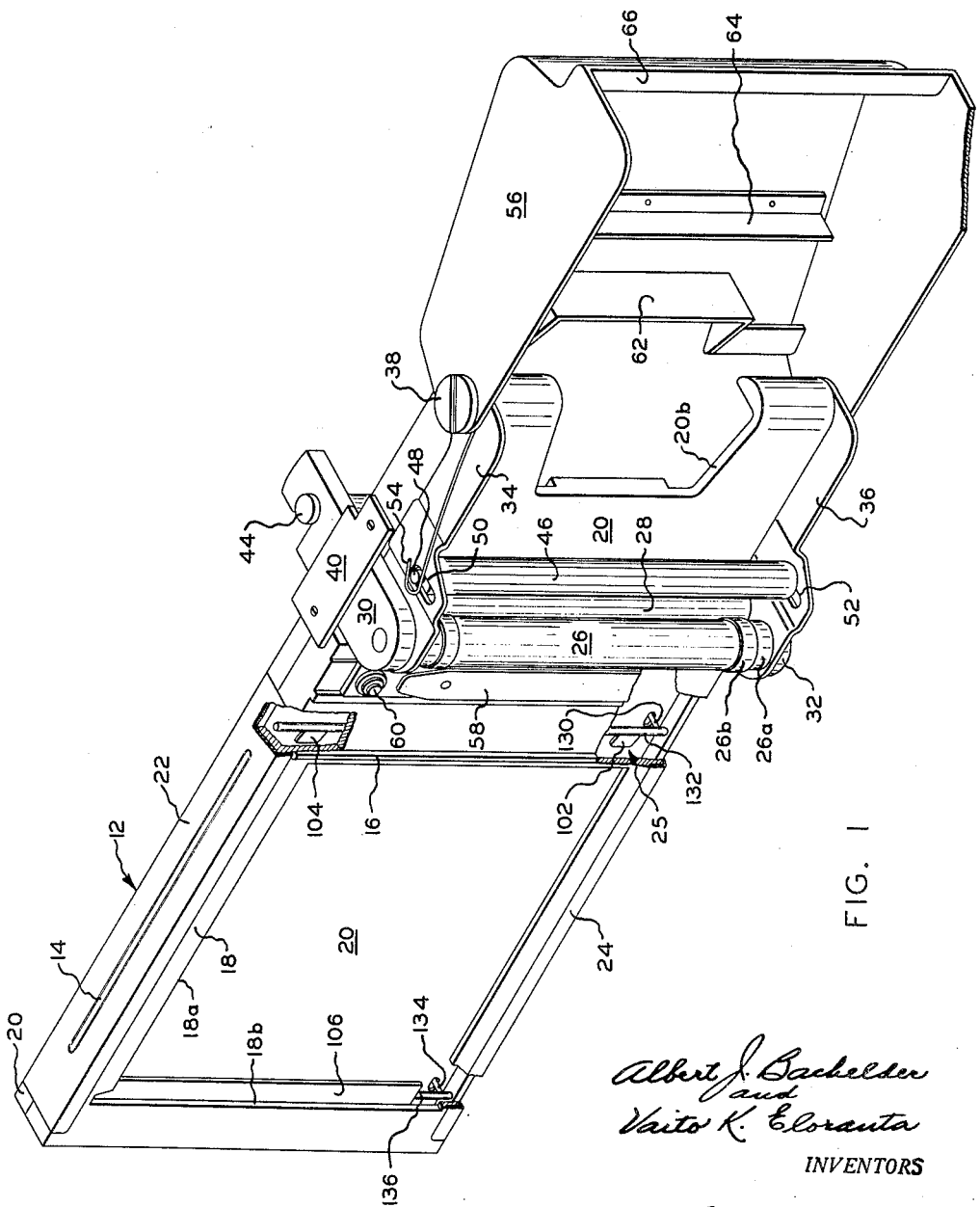
FIGURE 1 is a perspective view, with parts broken away, of positioning and processing mechanism of a photographic camera adapter apparatus.

In FIG. 1, adapter apparatus 12 suitable for incorporation with or attachment to a camera such as a "press camera" (not shown) is illustrated. The adapter easily slides into the standard channel provided at the rear of the camera which is normally used for receiving the camera back, said channel lying adjacent the focal plane of the camera lens system. The adapter can serve either in place of the camera back or it can readily be inserted between the camera back and the camera body, a light-tight seal being effected between the adapter and the camera elements in either instance. Grooves 14, extending along both sides of the adapter, are provided for engagement by retaining elements of the camera. Rib element 16 serves as a limit stop for ensuring correct position of the adapter in the camera channel and as a light-shielding element. The view of FIGURE 1 illustrates the front side of the adapter, namely, the side which, when mounted in the camera, faces the light of a photographic exposure entering through the camera lens. The assembly includes a front plate 18 and a rear plate 20 held together by a suitable fastening means such as longitudinally extending spring clips 22 and 24 which permit rapid joining of the plates in assembled relation. Front plate 18 has a cut-out area formed therein which is employed for positioning and framing a photosensitive element of the composite sheet-like structure during its photographic exposure. The marginal areas and other areas of plate 18 which overlie areas of plate 20 are spaced therefrom by portions of the plate structure to provide, between said areas, a semi-enclosed chamber having an entrance port or aperture 25, said chamber and port enabling slidable movement therebetween of the composite sheet-like structure shown in FIG. 2. Plate 20 servese as the principal supporting plate for the mechanisms of the adapter apparatus.

Further referring to FIG. 1, other elements of the apparatus which are illustrated relate to photographic exposure and processing of components of the composite sheet-like assembly. A pair of pressure rollers 26 and 28, preferably formed of a non-corrosive metal such as stainless steel are employed for processing purposes. Roller 26 is mounted for rotation in a pair of supports or carriers 30 and 32 which are rigidly attached to pivotal arms 34 and 36. Arms 34 and 36 are pivotally fastened to plate 20 by screws or bearing means 38 (one only shown), thus allowing bodily movement of carriers 30 and 32 and permitting roller 26 to be moved bodily toward and away from roller 28. Roller 28 is mounted for rotation in bearing means provided at each end of a transversely-extending, semi-enclosed recess 20a formed in plate 20. A pair of plates 40 (one only shown) permits the aforesaid movement of carriers 30 and 32 to occur freely but prevents their undesired movement in a lateral direction and also serves as a guard or shield to protect the roller-mounting elements. When the rollers are being used for compressing the longitudinally moving composite sheet-like assembly for processing purposes, roller 26 is biased toward roller 28 by a flat spring 42 which bears, respectively, against the underside of reserved portion 20a of rear plate 20 and a rod 44, the spring 42 and rod 44 being shown more clearly in FIG. 4. The aforesaid pivotal mounting of the supports or carriers 30 and 32 for roller 26 avoids any binding of the moving and fixed parts or undesirable friction which might occur, if for example, the carriers were mounted for slidable movement in a direction angularly disposed with respect to the longitudinal direction in which the film unit is drawn between the rollers. When the composite sheet-like assembly is to be inserted in the apparatus of adapter 12, roller 26 is moved away from roller 28 by separating means to be described below, and the rollers are held in spaced relation, thus permitting insertion of the composite sheet-like assembly between the rollers. When the composite assembly of FIG. 2 and adapter 12 are employed together, roller 26 is moved away from roller 28 by separating means to be described below, and the rollers are held in spaced relation, thus permitting insertion of the composite assembly between the rollers. Loading of the assembly will be explained in connection with a description thereof, which follows.

Light-shielding means, for preventing entrance of unwanted actinic light to a photosensitive surface identified with one of the sheet-like components is preferably located adjacent the "bite" of the pressure rollers. A suitable light-shielding device comprises a soft rubber roll 46 having its axis 48 mounted for both rotation and bodily movement in slots 50 and 52 formed, respectively, in pivotal arms 34 and 36. Light-shielding roll 46 is biased at its extremities toward plate 20 by wire springs 54 (one only shown). When the composite assembly has been loaded in adapter 12, a protective light-shielding housing or cover 56, pivotally attached to plate 20 by bearing means 38, serves to enclose pressure rollers 26 and 28 and light-shielding roll 46. Cover 56 is shown at the open position which permits access to the pressure rollers. A slidable latch 58, actuated by a knob 60, holds cover 56 at closed position. Flanged portions 62, 64 and 66 of the cover provide additional light-shielding means when the cover is closed.

Figure 2:
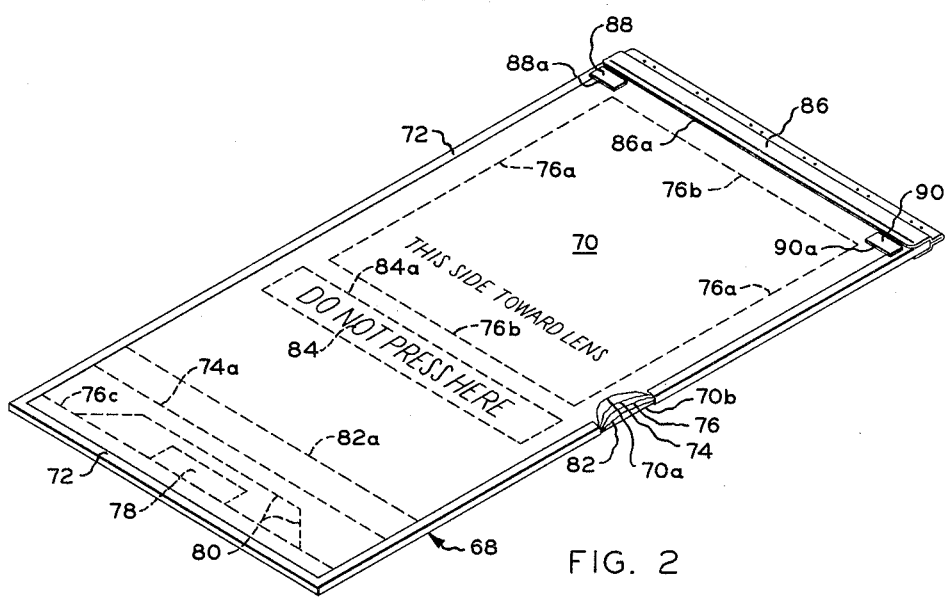
FIG. 2 is a perspective view, with parts broken away, of the novel film unit consisting of an envelope and contained sheet-like and fluid container components.

The novel film unit composite assembly 68 is illustrated in FIG. 2 as it would appear ready for functional association with the adapter apparatus of FIG. 1. The assembly is shown in section in FIG. 3. The unit 68 comprises a plurality of sheet-like and other elements in generally superposed relation. The outermost of these elements is in enclosing envelope 70 formed, for example, of an opaque paper stock which is folded or sealed against the entrance of actinic light along three of its sides or edges, the construction shown consisting of individual front and rear walls 70a and 70b, sealed along adjacent sides by binding means 72. It will be noted that marginal portions 26a of pressure roller 26 are of reduced diameter and are thus prevented from bearing against the binding means 72. The fourth or front side of the envelope 70c shown in FIG. 5, namely, that side which is first introduced in the adapter of FIG. 1 during loading, is unsealed to permit withdrawal or reinsertion of the components which it contains, as will be described below.

Next in order, underlying the front wall 70a of envelope 70 is the print-carrying layer or sheet 74, hereinbefore mentioned with respect to the photographic transfer process. Sheet 74 is formed of a paper or other material, as for example a baryta coated paper, having a surface suitably prepared for receiving the aforementioned soluble complex and adapted to undergo such modification as may be necessary to the formation of a positive image thereon. Print-carrying sheet 74 has a width slightly less than that of the envelope so that it can be slidably removed therefrom. The rear limit of sheet 74 is defined by the line 74a.

A masking sheet 76 is releasably bonded to the underlying, image-receiving surface of the print-carrying sheet 74. A cut-out area of the masking sheet lying within longitudinal marginal areas 76a and transverse marginal areas 76b is employed to define the picture area of print-carrying sheet 74 which will ultimately be employed for bearing the completed positive image. Masking sheet 76 extends rearwardly slightly beyond the limit 74a of print-carrying sheet 74 to the line 76c. Sheet 76 is attached to the front wall 70a of the envelope by a small area of an adhesive substance 78. Linear perforations 80 formed in the area of sheet 76 adjacent adhesive area 78 are adapted to be torn apart so as to permit sheet 76 to be separated from the wall 70a of the envelope, thus enabling the print-carrying sheet 74 to be freely withdrawn from the envelope after the positive image is formed.

A sheet 82, bearing a photosensitive emulsion and having a width which is slightly less than that of the envelope to permit its relative slidable movement therewithin, is located immediately behind masking sheet 76. The rear edge of the sheet is indicated by broken line 82a. Sheet 82, hereinafter called the photosensitive sheet, may be composed of any suitable material as, for example, a film of cellulose acetate or a paper having a photosensitive emulsion comprising a silver halide formed thereon.

Figure 3:
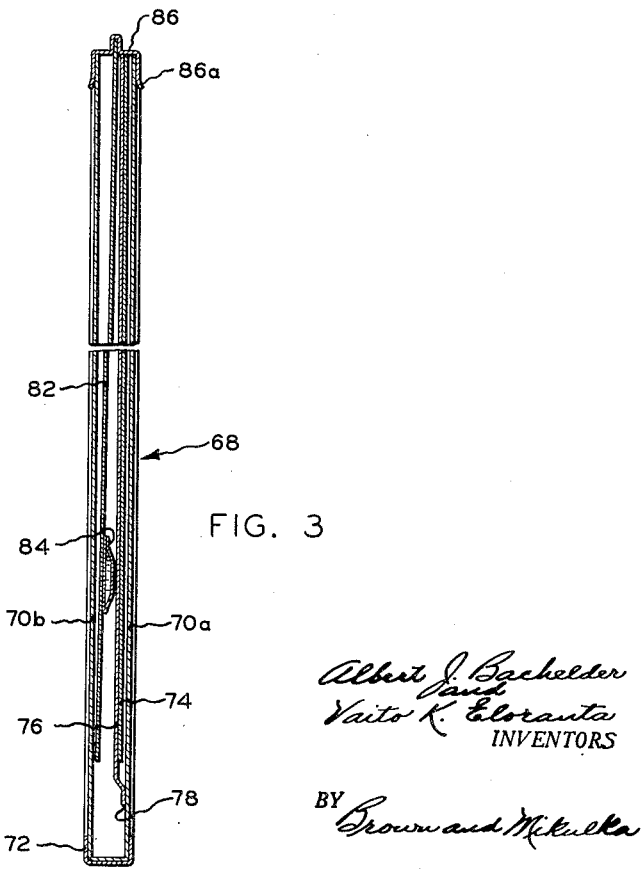
FIG. 3 is a sectional view of the assembly of FIG. 2.

An elongated liquid-carrying container or envelope 84 encloses a given supply of processing fluid constituting the liquid reagent hereinbefore mentioned in describing the photographic transfer process. The walls of container 84 are preferably of a multi-layer construction, formed of vapor- and liquid-impervious materials comprising, for example, a paper and a metal foil. The container is fastened to the emulsion side of sheet 82 by suitable adhesive means. It is so positioned on sheet 82 that a pair of its superposed marginal areas 84a, which are releasably bonded together so as to separate when subjected to a given mechanical stress, are located adjacent edge 76a of the masking sheet 76 and, accordingly, adjacent image areas of the photosensitive and print-carrying sheets. A multi-purpose clip 86 preferably formed of a material such as steel or a plastic, is permanently fastened as, for example, by crimping, to that edge of photosensitive sheet 82 which is adjacent to the unsealed edges 70c of the envelope. As shown in FIGS. 2 and 3, clip 86 constitutes a closure for envelope 70, thus preventing an unwanted entrance of actinic light to the photosensitive area contained within the envelope, by compressing the open edges 70c and 70d of the envelope together and by providing a light shield around the area adjacent to said edges. Its additional functions, as well as those performed by raised strips or platforms 88 and 90, will be described hereinafter relative to photographic exposure and processing operations. Flared edges 86a of the clip extend inwardly of the envelope edges 70c and provide a margin of safety with respect to light-sealing requirements.

In loading the composite assembly as shown in FIG. 2 in the adapter apparatus of FIG. 1, cover 56 of the adapter is swung to the closed position shown in FIG. 4 and the film unit is inserted through the slot provided at the rear of the cover. It is first necessary to space the rollers 26 and 28 of the adapter sufficiently apart to permit unobstructed insertion of the composite assembly through the entrance port 25 which leads to the semi-enclosed chamber provided between plate 20 and marginal framing areas of plate 18. This is effected by mechanism of the adapter shown in FIG. 4. A bracket 92, rigidly attached to rear plate 20, is formed so as to bridge the flat spring 42 and the rod 44. Rod 44 is releasably mounted for disassembly purposes in slots 30a and 32a. A yoke 94 is rigidly attached to bracket 92. A toggle type lever mechanism 96 comprises a handle portion 96a and an integral shaft 98, the latter being mounted for rotation in bearing surfaces of yoke 94. An offset, roller-type bearing 100 is mounted on the lower extremity of lever 96. Whenever the lever is actuated, bearing 100 is moved eccentrically toward or away from rod 44 depending on the direction in which the lever is turned, causing the rod to move either against or with the direction of force exerted by the spring 42, and, accordingly, causing pressure roller 26 to move away from or toward roller 28. When lever 96 is rotated to its limit in a counterclockwise direction, as viewed in FIG. 4, it places the adapter apparatus in readiness both for loading the composite sheet material assembly and for subsequent photographic exposure of the photosensitive surface. This position of lever 96 causes bearing element 100 to force rod 44 downwardly against the bias of spring 42. Roller 26 is thereby forced away from roller 28 sufficiently to permit free passage of the composite assembly 68 between the rollers during the loading operation. The composite assembly of FIG. 2 is loaded in a direction from right-to-left of the apparatus as viewed in FIG. 1, with clip 86 foremost and with the side carrying the inscription "the side toward lens" nearest to the camera lens, namely, toward the viewer. During the loading operation the composite assembly is inserted under spring-biased roller 46, between spaced rollers 26 and 28, through the chamber entrance aperture 25 and between the spaced marginal areas of plates 18 and 20 forming the exposure chamber, to the limit permitted by the chamber extremity 18b. When the assembly is thus loaded in the adapter apparatus, the area of the photosensitive sheet 82, delineated by the cut-out areas 76a and 76b of masking sheet 76, will be approximately centered on the cut-out area 18a of adapter plate 18. During the loading operation, the clip and envelope surface of the composite assembly is permitted to slide easily in back of spring-loaded detent vanes 102 and 104 and detent blade 106. The detent blade 106 engages the flared edge 86a of clip 86 and serves to hold the clip and the attached photosensitive sheet 82 in the exposure chamber while envelope 70 is being withdrawn to permit the photographic exposure. Detent vanes 102 and 104 engage edges 88a and 90a of the strips or platforms 88 and 90 when the envelope 70 has been withdrawn to a distance which uncovers photosensitive sheet 82 sufficiently to permit the photographic exposure.

When lever 96 is rotated in a clockwise direction, as viewed in FIG. 4, bearing element 100 no longer exerts pressure on the central portion of rod 44 and the rod is allowed to move upwardly under compulsion of spring 42. The underlying central area of spring 42 bears against the contoured area 20a of plate 20. The extremities of the spring bear against rod 44, biasing the rod in a direction away from plate area 20a. When rod 44 is thus released by bearing element 100 and is caused to move in the direction provided by spring 42, it carries supports 30 and 32 with it in a similar direction, thus drawing pressure roller 26 toward pressure roller 28 so as to apply a given compressive force to the composite sheet-like assembly when positioned in the adapter apparatus.

Assuming the composite sheet-like assembly and adapter components of the apparatus to be incorporated with a camera, with the side of the adapter shown in FIG. 1 facing the camera lens and with lever 96 at the position which spaces the pressure rollers 26 and 28 apart and places the detent means 102, 104 and 106 at positions for engaging their functionally related components, as above described, the apparatus is in readiness for performing the steps leading to the photographic exposure. The envelope 70 is grasped adjacent area 78 thereof, as permitted by the cut-out area 20b of plate 20, and is withdrawn to the limit determined by engagement of the normally disposed strip edges 88a and 90a with detent vanes 102 and 104, as above described, thus uncovering photosensitive sheet 82. The assembly, as it would be arranged when ready for the photographic exposure, is shown in FIG. 5. After completing the photographic exposure as, for example, by lens and shutter means, not shown, the envelope is returned inwardly of the adapter chamber to the extremity 18b of the chamber and the assembly resumes the appearance of FIG. 2. To facilitate this operation, protruding extremities 70d and recessed intermediate portions 70c of the envelope are provided to ensure entrance of the unsealed envelope edges into the flared edges 86a of the clip 86, the flared edges also contributing to this operation and the clip being held against movement between blade 106 and the end of the chamber during return of the envelope. Extremities 70d can be inserted to the full depth of clip 86, the latter serving to fasten the ends of the envelope tightly together and providing an effective seal against entrance of actinic light into the envelope, should it be desired, for any reason, to remove the assembly from the adapter before the processing operation. Removal of the assembly from the adapter after exposure but without processing will be described following a description of the processing operation.

After photographic exposure and return of the envelope to its position enclosing the exposed surface area, as above described, the assembly of sheet components, processing fluid and envelope is ready for the processing operation. Lever 96 is rotated as far as it will go in a clockwise direction, as viewed in FIG. 4. This removes bearing 100 from contact with rod 44 and permits pressure roller 26 to be biased toward pressure roller 28 under compressive force applied by spring 42. The pressure rollers are thus caused to engage the assembly beneath the inscription "do not press here," as viewed in FIG. 2, namely, just to one side of container 84.

Coincidental with the positioning of the rollers for the application of compressive force to the composite assembly, detent vanes 102 and 104 and detent blade 106 are automatically raised from positions, previously described, which caused them to contact strips 88 and 90 and clip 86, respectively, of the assembly. When the detents are thus removed from their contacting positions, the film unit can be fully advanced between the rollers. Mechanism for actuating the aforesaid detents is shown in FIG. 4 and comprises elements actuated by lever assembly 96 and integral shaft 98. An offset bearing means 108, fixedly mounted on the end of shaft 98, is caused to describe an eccentric movement when the lever and shaft are rotated, thus causing lateral movement of an interlocking link element 110. When lever 96 is rotated in a clockwise direction, as viewed in FIG. 4, thus positioning the pressure rollers for their compressive function, link 110 moves in a direction to the left, causing bell crank 112 to rotate in a counterclockwise direction. The bell crank engages a projection 114 extending downwardly from bar 116, driving the bar to the left. Bar 116 has a second downwardly extending projection 118 which, during its movement to the left, engages a lever 120 and causes the latter to pivot in a counterclockwise direction against the bias applied by a wire spring 122. Bar 116 has a third downwardly extending projection 124 which, during said movement to the left, engages a lever 126 and causes the latter to pivot in a counterclockwise direction against the bias applied by a wire spring 128. Lever 120 has a yoke-like extremity 120a which engages a pivotal actuating member 130 of the rotatably mounted shaft 132 carrying detent vanes 102 and 104. Lever 126 has a yoke-like extremity 126a which engages a pivotal actuating member 134 of the rotatably mounted shaft 136 carrying detent blade 106. Movement of bar 116 occurs to the left when actuated by bell crank 112 and to the right under the bias of springs 122 and 128. The linear direction and limits of movement of the bar are controlled by the slots 138 and 140 and the fixed screws 142 and 144. A removable cover or shield 146, shown with parts broken away, is employed for protecting the mechanism.

To process the components of the composite assembly, the envelope is grasped adjacent area 78 so that the envelope and underlying portions of sheet 76 are held firmly. The entire assembly is then drawn, preferably at an even speed, between the compression rollers 26 and 28 until clip 86 comes in contact with the rollers. Roller 26 is then moved away from roller 28 by means of lever 96, as described above. This permits unobstructed passage of the clip and the assembly is then withdrawn completely from the adapted apparatus. During the course of the aforesaid processing movement of the assembly, fluid container 84, enclosing the liquid reagent, is caused to rupture or separate along its releasably-sealed edges 84a under mechanical stress applied by the pressure rollers, thus releasing the liquid reagent to the image areas. The liquid reagent is spread in the form of a layer of given thickness between the contiguous facing areas of the photosensitive sheet 82 and the print-carrying sheet 74 which are bounded by marginal areas 76a and 76b. Longitudinal marginal areas 76a of the masking sheet, in addition to defining the picture area, also serve a spacing function to provide a given separation between pressure rollers 26 and 28 during the fluid spreading operation and thus, to a considerable extent, they determine the proper thickness and extent of coverage of the coating of the liquid reagent which is simultaneously spread across the facing areas of sheets 82 and 74. In order that a relatively thin masking sheet material may be employed while still serving a satisfactory spacing function relative to the rollers, as above described, roller 26 is provided with peripheral band areas 26b of slightly increased diameter relative to other portions. These bands operate in conjunction with masking sheet areas 76a to determine the correct spacing of the rollers for spreading the processing fluid between sheets 82 and 74. At the conclusion of the aforesaid spreading operation, the strips 88 and 90 are drawn between the pressure rollers 26 and 28 and roller 26 is caused to be separated from roller 28 by a slightly increased distance due to the increased effective thickness of the envelope provided by the strips. This construction permits an area or pocket extending transversely between platforms 88 and 90 which is relieved of compression to be utilized for confining or trapping any portion of the liquid reagent in excess of that required within the image areas, which may have been forced beyond the transverse limit of these areas.

After the assembly has been withdrawn from the adapter apparatus, it is preferably allowed to remain in an unaltered, assembled state for a given period as, for example, for approximately one minute, to complete the processing operation. The print-carrying sheet 74, the attaching masking sheet 76 and the photosensitive sheet 82 are then withdrawn from envelope 70 as a single unit by means of clip 86, the print-carrying and photosensitive sheets being held or bonded together through the adhesive properties of the processing fluid. The print-carrying sheet is simultaneously stripped from the masking and photosensitive sheets, the completed positive image then appearing on the print-carrying sheet. The masking sheet provides a framed area around the area of the positive print which differs, for example, in density from the image area.

If it is desired to remove the composite assembly from the exposure chamber before its components have been processed as, for example, when it is desired to perform a rapid succession of photographic exposures of more than one assembly and to process the exposed assemblies later, the apparatus is also adapted to permit this type of operation. Assuming the photographic exposure to have been completed and envelope 70 to have been returned to the position shown in FIG. 2, as above described, the pressure rollers 26 and 28 will be at their noncompressive positions of widest separation and the detent vanes 102 and 104 and detent blade 106 will be at their functional engaging positions with respect to the assembly. It is only necessary to draw handle 116a, attached to bar 116, in a direction to the left, as viewed in FIG. 4, to release the aforesaid detent means from engagement with the assembly. The assembly can then easily be withdrawn from the adapter apparatus without being subjected to any compressive forces.

It is to be understood that the fluid container 84 could be attached to that surface of the masking sheet 76 which faces photosensitive sheet 82 instead of to the latter sheet, as shown, without materially affecting the processing operation. Other minor changes could be made in the constructions of the composite assembly without altering its operability to any appreciable extent as, for example, the print-carrying sheet 74 could be releasably attached directly to envelope 70 instead of through the intermediary of the masking sheet 76. In a further modification it would be possible to dispense with the masking sheet entirely and to employ other means for forming a frame around the image area of the positive print, such as through a pretreatment of the frame portions of the print-carrying sheet to render these portions unaffected by the processing fluid. If the masking sheet were eliminated, it will be apparent that means would have to be provided to supplant the spacing function served by longitudinal masking areas 76a. One alternative would, of course, be to increase the height of the spacing bands 26b of pressure roller 26.

It is conceivable that the film unit of the invention could be employed with a camera other than a press camera and that it could be adapted to photographic methods and practices other than those described herein, or could readily be modified for such purposes. For example, other photographically photosensitive materials could be employed which are adapted to color photography or which are responsive to invisible radiation such as the ultraviolet, the infrared or forms of nuclear radiation.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A photographic film unit adapted to provide within elements of said film unit both a latent negative image and a visible positive image of subject material of a photographic exposure, said photographic film unit comprising an envelope formed of a material substantially opaque to actinic radiation, said envelope having a front and a rear surface, being sealed along three edges and having an unsealed fourth edge, means comprising at least one strip attached to one of said envelope surfaces adjacent said unsealed edge forming limit stop means for controlling the withdrawal of said envelope from its covering position with respect to a contained sheet material, a first sheet-like element having a surface for forming said positive image releasably attached to an inner surface of said envelope, a second sheet-like element slidably contained in said envelope having a photosensitive surface facing said positive image-forming surface for forming said latent negative image, a spring clip attached to the edge of said last-named sheet-like element which is positioned adjacent said unsealed fourth edge of the envelope, said clip serving to enclose said unsealed fourth edge of the envelope and to compress and releasably hold at least the extremities thereof tightly together to prevent admittance of said actinic radiation, said clip also serving to hold said attached sheet-like element having said photosensitive surface stationary when said envelope is withdrawn therefrom to photographically expose said surface, and a compressible fluid container fixedly held at a given location within the envelope between said image-forming surfaces, said container extending transversely of said surfaces and releasably containing a given quantity of a processing fluid adapted to be released from said container between separable edges thereof and spread between said image-forming surfaces when mechanical stress is progressively applied to the external surfaces of said envelope.

2. A photographic film unit adapted to provide within elements of said film unit both a latent negative image and a visible positive image of subject material of a photographic exposure, said photographic film unit comprising an envelope formed of a material substantially opaque to actinic radiation, said envelope having a front and a rear surface, being sealed along three edges and having an unsealed fourth edge, means comprising a pair of spaced strips attached to one of said envelope surfaces adjacent opposite extremities of said unsealed edge forming limit stop means for controlling the withdrawal of said envelope from its covering position with respect to a contained sheet material, a first sheet-like element having a surface for forming said positive image releasably attached to an inner surface of said envelope, a second sheet-like element slidably contained in said envelope having a photosensitive surface facing said positive image-forming surface for forming said latent negative image, a spring clip attached to the edge of said last-named sheet-like element which is positioned adjacent said unsealed fourth edge of the envelope, said clip serving to enclose said unsealed fourth edge of the envelope and to compress and releasably hold at least the extremities thereof tightly together to prevent admittance of said actinic radiation, said clip also serving to hold said attached sheet-like element having said photosensitive surface stationary when said envelope is withdrawn therefrom to photographically expose said surface, and a compressible fluid container fixedly held at a given location within the envelope between said image-forming surfaces, said container extending transversely of said surfaces and releasably containing a given quantity of a processing fluid adapted to be released from said container between separable edges thereof and spread between said image-forming surfaces when mechanical stress is progressively applied to the external surfaces of said envelope.

3. A photographic film unit as defined in claim 1 wherein said unsealed edge has at each transverse end thereof a protruding integral tongue extending longitudinally of said envelope and said spring clip serves to receive said protruding tongues to compress and releasably hold the extremities of said fourth edge.

4. A photographic film unit as defined in claim 3 wherein said spring clip is in the form of an elongated U-shaped member having substantially parallel sides terminating in flared extremities.

5. A photographic film unit adapted to provide within elements of said film unit both a latent negative image and a visible positive image of subject material of a photographic exposure, said photographic film unit comprising an envelope formed of a material substantially opaque to actinic radiation, said envelope having a front and a rear surface, being sealed along three edges and having an unsealed fourth edge, means providing increased thickness to at least a portion of said envelope and forming a part thereof to comprise limit stop means for controlling the withdrawal of said envelope from its covering position with respect to a contained sheet material, said increased thickness being provided adjacent opposite extremities of said fourth edge, there being an area of said envelope of unincreased thickness lying therebetween, a first sheet-like element having a surface for forming said positive image releasably attached to an inner surface of said envelope, a second sheet-like element slidably contained in said envelope having a photosensitive surface facing said positive image-forming surface for forming said latent negative image, a spring clip attached to the edge of said last-named sheet-like element which is positioned adjacent said unsealed fourth edge of the envelope, said clip serving to enclose said unsealed fourth edge of the envelope and to compress and releasably hold at least the extremities thereof tightly together to prevent admittance of said actinic radiation, said clip also serving to hold said attached sheet-like element having said photosensitive surface stationary when said envelope is withdrawn therefrom to photographically expose said surface, and a compressible fluid container fixedly held at a given location within the envelope between said image-forming surfaces, said container extending transversely of said surfaces and releasably containing a given quantity of a processing fluid adapted to be released from said container between separable edges thereof and spread between said image-forming surfaces when mechanical stress is progressively applied to the external surfaces of said envelope, said container being located remote from said fourth edge such that said image-forming surface lies between said fourth edge and said container whereby said processing fluid may be spread from said container toward said fourth edge upon application of said mechanical stress.

6. A photographic film unit as defined in claim 5 wherein said increased thickness is provided by a pair of strips attached to one of the surfaces of said envelope, said strips being of a material having predetermined thickness and dimensions.

7. A photographic film unit adapted to provide within elements of said film unit both a latent negative image and a visible positive image of subject material of a photographic exposure, said photographic film unit comprising a rectangular envelope formed of a flexible material substantially opaque to actinic radiation, said envelope having a front and a rear surface, being sealed along one transverse and two longitudinal edges and having an unsealed transverse fourth edge, said last-named edge having at each transverse end thereof a protruding integral tongue extending longitudinally of said envelope, a pair of strips of a material of given thickness and dimensions attached to an outer surface of said envelope, one of said strips being adjacent each transverse end of said unsealed fourth edge, said pair of strips providing, respectively, limit stop means for controlling the withdrawal of said envelope from its covering position with respect to a contained sheet material, an increased effective thickness of said envelope at their areas of attachment, and an area of unincreased thickness extending transversely between said strips, a first rectangular sheet-like element having a surface for forming said positive image releasably attached to an inner surface of said envelope, a masking sheet having a rectangular cut-out area releasably bonded to said postive image-forming surface of said sheet-like element for defining the area of said positive image, a second rectangular sheet-like element slidably contained in said envelope having a photosensitive surface facing said positive image-forming surface for forming said latent negative image, an elongated U-shaped spring clip having substantially parallel sides flaring slightly outwardly at the open end of the U, said clip being attached to the edge of said last-named sheet-like element which is positioned adjacent said unsealed fourth edge of the envelope, said clip serving to receive said protruding tongues, to enclose said unsealed fourth edge of the envelope and to compress and reelasably hold the extremities thereof tightly together to prevent admittance of said actinic radiation, said clip also serving to hold said attached sheet-like element having said photosensitive surface stationary when said envelope is withdrawn therefrom to photographically expose said surface, and an elongated compressible fluid container fixedly held at a given location within the envelope between said image-forming surfaces, said container extending transversely of said surfaces and releasably containing a given quantity of a processing fluid adapted to be released from said container between separable edges thereof and spread between said image-forming surfaces when mechanical stress is progressively applied to the external surfaces of said envelope.

8. A photographic film unit as defined in claim 7, wherein said masking sheet is of a greater length than said first sheet-like element employed for said positive image and is releasably attached to said first sheet-like element and to an inner surface of the envelope.

References Cited in the file of this patent
UNITED STATES PATENTS

| | | |
|---|---|---|
| 2,329,228 | Stiffler | July 24, 1941 |
| 2,483,389 | Wolff | Oct. 4, 1949 |
| 2,483,391 | Cannon | Oct. 4, 1949 |
| 2,496,630 | Land | Feb. 7, 1950 |
| 2,543,180 | Land | Feb. 27, 1951 |
| 2,565,377 | Land | Aug. 21, 1951 |
| 2,638,826 | Fairbank | May 19, 1953 |
| 2,686,717 | Land | Aug. 17, 1954 |
| 2,740,714 | Bachelder et al. | Apr. 3, 1956 |